Nov. 10, 1964   R. REITHERMAN   3,156,858
SYNCHRONOUS AND INDUCTION MOTOR OPERATION FROM
A D.C. SOURCE BY MEANS OF A SOLID STATE
INVERTER INTEGRAL WITH THE MOTOR
Filed Sept. 11, 1961

INVENTOR.
Ralph Reitherman.
BY
James R. McKnight
Attorney.

United States Patent Office

3,156,858
Patented Nov. 10, 1964

3,156,858
SYNCHRONOUS AND INDUCTION MOTOR OPERATION FROM A D.C. SOURCE BY MEANS OF A SOLID STATE INVERTER INTEGRAL WITH THE MOTOR
Ralph Reitherman, Lake Villa, Ill., assignor to Small Motors Inc., Chicago, Ill., a corporation of Illinois
Filed Sept. 11, 1961, Ser. No. 137,385
4 Claims. (Cl. 318—138)

This invention relates to apparatus for operating synchronous and induction motors from a direct current source by means of solid state devices integral with the motor.

It is among the objects of this invention to operate a motor with a D.C. source without the use of brushes. This eliminates the objectionable features of brush wear and commutator wear. At high altitudes, brushes and commutators wear out more quickly. Heretofore, these problems were attempted to be solved by motor generator sets converting from D.C. into A.C. This added much weight and extra cost. My invention solves these problems without these added difficulties.

My invention also comprises such other objects, advantages and capabilities as will later more fully appear and which are inherently possessed by my invention.

While I have shown in the accompanying drawings a preferred embodiment of my invention, yet it is to be understood that the same is susceptible of modification and change without departing from the spirit of my invention.

Figure 1:
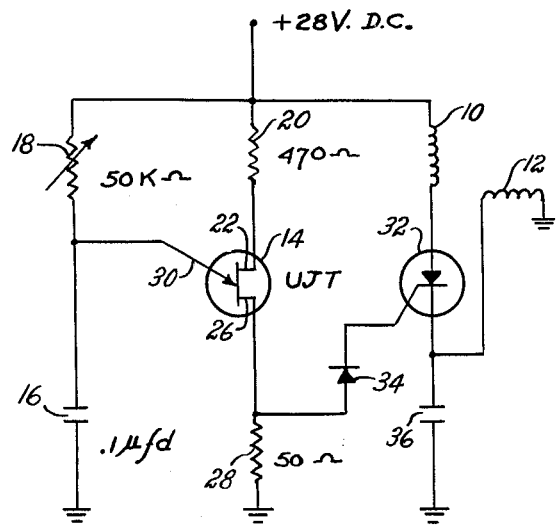
Figure 2:
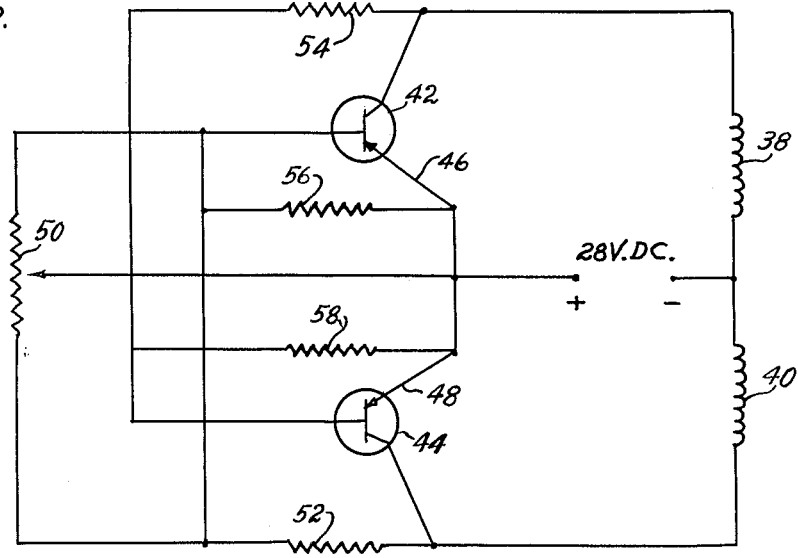

The invention is illustrated diagrammatically in the following drawings wherein:

FIG. 1 is a circuit diagram illustrating one form of the invention in which the motor coils are pulsed by a solid state circuitry, and FIG. 2 is a circuit diagram showing a second transistor circuit for pulsing the coils of a synchronous motor.

Referring to FIG. 1, coils 10 and 12 may be the motor coils of a two-phase motor. A unijunction transistor 14 is in a relaxation oscillator circuit with a capacitor 16 and a variable resistor 18. A positive source of D.C. potential is connected through a current limiting resistor 20 to base one indicated at 22 of the transistor 14 and base two indicated at 26 is connected through a resistor 28 to ground. The emitter 30 of the transistor 14 is connected between the capacitor 16 and the variable resistor 18.

In operation, the capacitor 16 will charge until the potential on the emitter 30 is sufficient to form a current path from emitter 30 to base 26. Capacitor 16 will then discharge through this path to provide a positive voltage through resistor 28. The pulse of current applied to the resistor 28 will trigger a silicon controlled rectifier 32 through a diode 34. Diode 34 is in the circuit to provide isolation between base two and the silicon controlled rectifier 32. When rectifier 32 conducts, a circuit will be completed through coil 10 and a capacitor 36. The capacitor 36 will charge and at the same time a voltage will be applied across coil 10 which, as covered above, is one of the motor coils in the two-phase motor. The current applied to coil 10 will cause rotation of the motor armature.

Assuming inductance 12, which is phase 2 of the motor, is large, the current through inductance 12, capacitor 36, and silicon controlled rectifier 32, tries to oscillate. At the end of the first half cycle, when the current reverses, silicon controlled rectifier 32 will revert to a blocking state, leaving capacitor 36 charged to a voltage greater than the supply voltage. Capacitor 36 will discharge through inductance 12 and then another pulse from unijunction transistor 14 will cause the cycle to repeat.

The operation described above will continue with first coil 10 being pulsed, followed by the pulsing of coil 12. The speed of the motor will be determined by the charge and discharge time of capacitor 16 which in turn is controlled by the time constant of this capacitor and resistor 18. The time constant and hence the speed of the motor can be changed by varying resistor 18.

FIG. 2 illustrates another circuit for pulsing a pair of motor coils indicated at 38 and 40. A pair of transistors 42 and 44 are connected in a conventional multivibrator circuit. The emitters 46 and 48 respectively are connected to the positive terminal of a D.C. source. A variable resistor 50 is connected to the base of transistor 42 and to the collector of transistor 44 through a resistor 52. A resistor 54 is connected to the collector of transistor 42 and to the base of transistor 44. Base stability is provided by resistors 56 and 58. The operation of FIG. 2 will not be described in detail as it performs as a conventional multivibrator circuit. Transistors 42 and 44 alternately conduct to alternately apply a voltage across coils 38 and 40 to drive the motor armature.

Although various values have been given to the circuit elements, the invention should obviously not be so limited. The values of the components in the circuits will depend upon the size and type of motor. In like manner, although a silicon controlled rectifier is very advantageous, other solid state devices performing similar functions may be used.

Whereas the preferred form of the invention has been shown and described herein, it should be realized that there are many modifications, substitutions and alterations thereto within the scope of the following claims.

Having thus described my invention, I claim:

1. In a two-phase motor, a pair of motor coils, means for pulsing first one coil and then the other, to drive the motor, including a source of D.C. connected to one coil, a one-way current conduction device connected to said coils, a capacitor connected to said current conduction device and said voltage source, and means for intermittently causing said one-way current device to conduct to pulse said one coil and to charge said capacitor, said capacitor discharging through the other coil when said current device is not conducting.

2. The structure of claim 1 further characterized in that said one coil is connected to one side of said current device, with said capacitor and the other coil being connected to the other side of said current device.

3. The structure of claim 1 further characterized in that said one-way current conducting device is a silicon controlled rectifier.

4. The structure of claim 1 further characterized in that the means for intermittently causing said current device to conduct includes a relaxation oscillator circuit with a unijunction transistor.

References Cited by the Examiner
UNITED STATES PATENTS
2,994,026   7/61   Sampietro _____ 318—254
2,995,690   8/61   Lemon _____ 318—138

ORIS L. RADER, *Primary Examiner.*
JOHN F. COUCH, *Examiner.*